United States Patent [19]
Kuo et al.

[11] Patent Number: 5,923,138
[45] Date of Patent: Jul. 13, 1999

[54] MANUALLY-OPERATED HANDWHEEL INTERPOLATION-GENERATING DEVICE

[75] Inventors: Lun-Yu Kuo; Wen-Peng Tseng; Hsin-Chuan Su, all of Taichung, Taiwan

[73] Assignee: Industrial Technology Research Institute, Hsinchu, Taiwan

[21] Appl. No.: 09/156,566

[22] Filed: Sep. 18, 1998

[30] Foreign Application Priority Data

Jun. 12, 1998 [TW] Taiwan ................................ 87209333

[51] Int. Cl.⁶ ................................................. G05B 11/01
[52] U.S. Cl. ........................ 318/560; 318/573; 318/569; 318/572
[58] Field of Search .................... 318/560, 573, 318/569, 572

[56] References Cited

U.S. PATENT DOCUMENTS 5,225,765 7/1993 Callahan et al. .................... 318/560 X
5,453,674 9/1995 Seki et al. .

*Primary Examiner*—Karen Masih
*Attorney, Agent, or Firm*—W. Wayne Liauh

[57] ABSTRACT

A manually-operated handwheel interpolation generating device mainly makes use of a set-up of pulse adjuster to be used by the operators to perform smoothing dressing for the handwheel's pulse command when they are using handwheel to perform post-stage precision machining so as to upgrade the precision level and surface roughness of workpieces, and said pulse adjuster comprises a handwheel interpolation generator which mainly makes use of a pulse smoothing dresser to attain the object of smoothing dressing, thereby, the present invention can, under the condition of keeping the total output pulse amount unchanged, effectively improve the non-smooth phenomena of the handwheel's manually-operated machining work and the surface roughness of workpieces.

20 Claims, 4 Drawing Sheets

MANUALLY-OPERATED HANDWHEEL INTERPOLATION-GENERATING DEVICE

FIELD OF INVENTION

The present invention relates generally to a manually-operated handwheel interpolation-generating device by which the user can use a pulse-smoothing modifier added to a pulse dresser by controlling the handwheel to send controlled pulse command in order to smoothly modify the workpieces so as to make the surface roughness finer.

BACKGROUND OF THE INVENTION

Although the totally automatic machine tools used in the market nowaday such as computerized numeric-controlled (CNC) milling machines or computerized numeric-controlled (CNC) lathes etc. are very convenient to the operators, the feed path or speed of the machine tools is set by the program. When it comes to incorrect path or improper speed coded in the program, it often causes waste of machining blanks or delay in the machining time. This kind of situation occurs mostly on the fine finishing process in the post-stage of machining work.

However, the post-stage of machining needs only some simple actions such as precisely modifying a circular groove or machining a fillet. It will take a long time and may even damage the original semi-finished products whenever there are some wrong actions if we were to execute by coding an automatic computerized numeric-controlled (CNC) program. What is more, it will be even harder to execute automatically whenever there is a need to perform precise dressing while measuring if the operator requires high precision level. To meet the foregoing requirements, it is more appropriate to machine them manually by the use of the conventional handwheel. But since the foregoing handwheel can not operate two axes at a time, thereby, if one can develop a manually-operated handwheel interpolation-generating device, one can perform bi-axial linear interpolation and biaxial arc-interpolation. Moreover, the interpolation works soon after the handwheel rotates and it stops soon after the handwheel stops, thereby, the machining works can be controlled freely by the skillful hands of the operators.

The block diagram of the handwheel interpolation control system of the prior art as shown in FIG. 1 mainly comprises a operation panel 10 which further comprises a manually-operated handwheel 11 and a manually-operated handwheel multiplicative selection switch 12 where the manually-operated handwheel 11 and the manually-operated handwheel multiplicative selection switch 12 give an output of pulse command in accordance with users' manually operation of handwheel, thereafter, send the pulse command to a position control hardware 20 which, in succession, connect to a servo control hardware 30 and a driven machine 40. In this way, it accepts the control of the users' operating panel to further drive the machine tools and execute our required machining actions. Besides, the operating panel 10 comprises also an axial selection 13 which provides users with the selection of the machining directions along the X, Y and Z axes.

However, the manually actions do not run smoothly. Without going through dressing, two defects on the machined workpieces will show up. Firstly, it will cause bad streaks on the surface if the speed is not a steady one; secondly, when it comes to arc-interpolation, any abrupt increase of pulsatile impulse will worsen the roundness. For example, the U.S. Pat. No. 5,453,674 exposes an interpolation action that uses the pulse output of handwheel by means of graphical interactive method to input the dimension of workpieces. The shortcoming is that it possesses the foregoing defects since the output pulse of the interpolation generator does not go through the action of machining dressing on smoothness, i.e. the manually-operated handwheel will decrease the speed steadiness of the lathe and worsen the surface smoothness of workpiece. Therefore, if one can develop a computerized numeric-controlled (CNC) manually-operated interpolation generator with high precision, high surface smoothness, one can provides rational resolutions for all the foregoing problems.

SUMMARY OF THE INVENTION

To aim at the foregoing shortcomings, the inventors hereby present a manually-operated handwheel interpolation generating device with high precision and high surface smoothness that can effectly improve the foregoing unsteadiness of the handwheel's output control and the bad surface roughness of the workpieces.

The main objective of the present invention is to provide a manually-operated interpolation generating device that can have output of biaxial linear synchronous action without programming the tool path. Also the handwheel's output pulse commands will first go through a pulse dresser to enable the output pulse become relatively smooth while keep the total pulse amount the same, so as to raise the precision level and the surface roughness of workpieces.

To attain the foregoing objective, the present invention, besides having the operation panel, position-control hardware, servo-control hardware and the driven machines, it also adds a pulse dresser which is installed between the circuits of the operation panel and the position-controlled hardware and is used to further adjust the handwheel's output pulse command so as to improve the smoothness of the pulse commands. In addition, the pulse-dresser is connected to an interface having a man-machine interface machining item input to accept the machining items required by the users. Moreover, the pulse dresser mainly comprises a manually-operated handwheel interpolation generator that can be used to have the output of relatively smooth pulse signals.

Furthermore, the pulse dresser comprises a circuit or software mechanism having dynamic adjustment of smoothing dressing parameter and is connected to the input of the machining items of the man-machine interface where the software mechanism means that the circuit can accomplish the function by software simulation.

What is more, the manually-operated handwheel interpolation generator in the pulse dresser consists of a pulse smoothing dresser and an interpolation generator of linear, arc and curvilinear types where the arc type of interpolation generator can be expressed with curvilinear type too.

In order to make your honor reviewer further understand the objectives, efficacies as well as the characteristics of the present invention, the author herewith present the illustration of the technical content and embodiments of the present invention with accompanied drawings as follows:

DESCRIPTION OF THE PREFERRED EMBODIMENTS

The present invention relates to a manually-operated handwheel interpolation generating device with high precision and high smoothness computerized numerical control wherein the output pulse command from the manually-operated handwheel interpolation generator can be smoothing dressed through the newly added pulse adjuster of the present invention, thereby, to improve the two shortcomings of the manually-operated handwheel technology of the prior art—i.e. the manually-operated handwheel will increase the unsteadiness of the machine tool, and it has relatively bad surface roughness of the workpieces to be machined.

Figure 1:
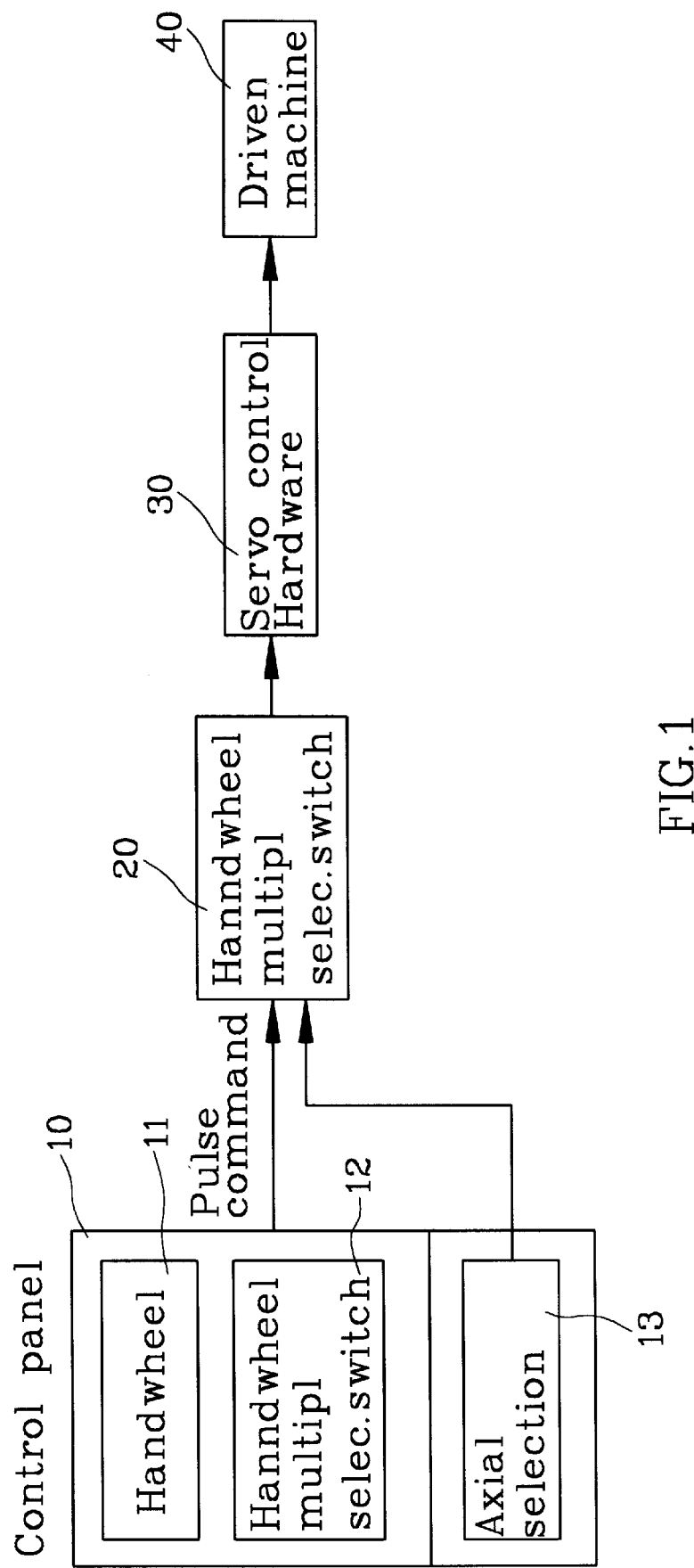
FIG. 1 is the schematic block diagram of the manually-operated handwheel interpolation control system of the machine tools of the prior art.
Figure 2:
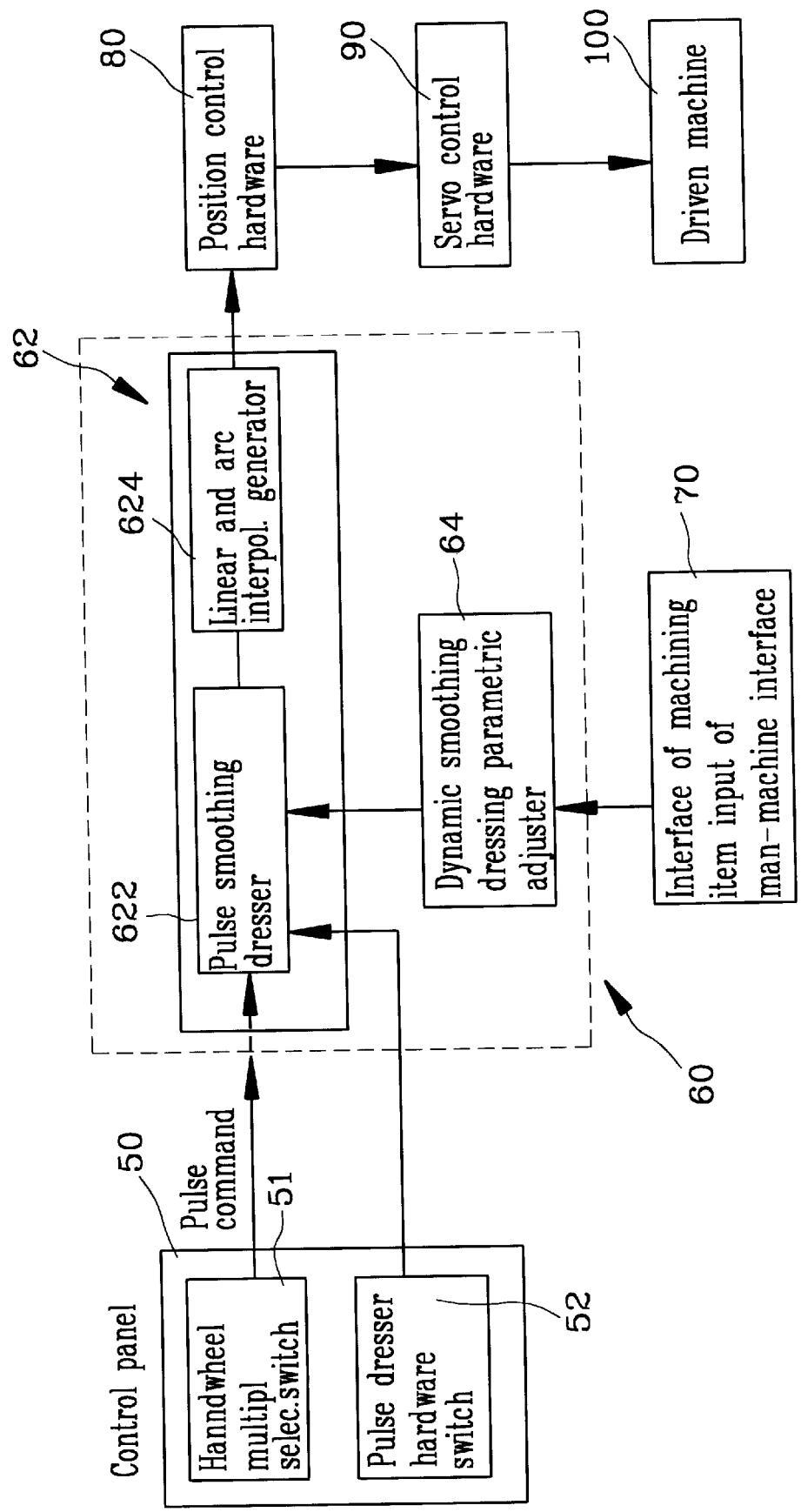
FIG. 2 is the schematic block diagram of the related control system of the manually-operated handwheel interpolation generating device of the preferred embodiment of the present invention.

FIG. 2 is a schematic block diagram of the related control circuit of the manually-operated handwheel interpolation generating device of the present invention. It mainly comprises a control panel 50 which further comprises a manually-operated handwheel and its multiplicative selection switch 51 as well as a pulse dresser hardware switch 52. The manually-operated handwheel and its multiplicative selection switch 51 are used for the user to execute handwheel's machining control and further select the required multiplicative, thereafter, the handwheel has an output of a pulse command. FIG. 2 shows a pulse adjuster 60 to accept the output pulse command given by the handwheel and is connected to the interface 70 of machining item input of the man-machine interface which accept users' machining items to perform further control. There is also a set-up having a connection between the pulse adjuster 60 and the pulse dresser hardware switch 52 on the control panel 50 that can aim at the pulse adjuster 60 to perform switching action.

With regard to the way the pulse dresser hardware switch act, it mainly can be replaced by the pulse's multiplicative. The replacement way is like this: if the pulse rate is ×10 or ×100, then it will automatically open the pulse smoothing dresser 622 set up in the pulse adjuster 60; but if the pulse rate is ×1 it will automatically close the pulse adjuster 60 in order to accurately perform the minute action of the handwheel.

In addition, since the pulse adjuster 60 is connected to a position control hardware 80 and in sequence, connected to a servo control hardware 90 and a driven machine 100, the handwheel can perform smoothing dressing for the output pulse command from the handwheel, thereby, not only to make the output pulse become relatively smooth under the condition of invariant total amount, but also to improve the machining precision level and surface roughness.

On the other hand, in order to attain the object of dressing the foregoing pulse to be relatively smooth, the pulse adjuster 60 contains a handwheel interpolation generator 62 and a dynamic smoothing dressing parametric adjuster 64 wherein the handwheel interpolation generator 62 is the key component of the present invention with its main function on dressing the output pulse command given by the handwheel to make the waveform become relatively smooth. Therefore, the handwheel interpolation generator contains a pulse smoothing dresser 622 in order to connect the output pulse command given by the handwheel to perform smoothing dressing.

Thereafter, the output of smoothing dresser 622 is connected to a linear and arc interpolation generator 624 used to generate linear or arc machining interpolation required by the workpieces to be machined. Besides, it can also generate curvilinear interpolation, and the curvilinear interpolation can be expressed also by the curvilinear way which can further control the position control hardware 80, servo control hardware 90 as well as the driven machine 100 to perform the machining of the workpieces. Among them, the position control hardware 80 is connected to the output end of the pulse adjuster 60 used to perform the position-change control of the handwheel. As for the driven machine 100, it is connected to the servo control hardware 90 which is used to represent the machines for the workpieces required to machine and to drive, such as the milling machines or lathe etc of machine tools.

On the other hand, the pulse smoothing dresser 622 is connected to the pulse dresser hardware switch 52 in order to accept the control of the hardware switch. And the pulse smoothing dresser 622 is again connected to the dynamic smoothing dressing parametric adjuster 64 and is used to accept the input items of the users' man-machine interface. Therefore, by the use of the handwheel interpolation generator 62 depicted by the present invention, together with its containing pulse smoothing dresser 622 as well as the linear and arc interpolation generator 624, it can generate relatively smooth pulse command to fit one's requirements of computerized numerical control machine tools with high precision and high smoothness.

Figure 3:
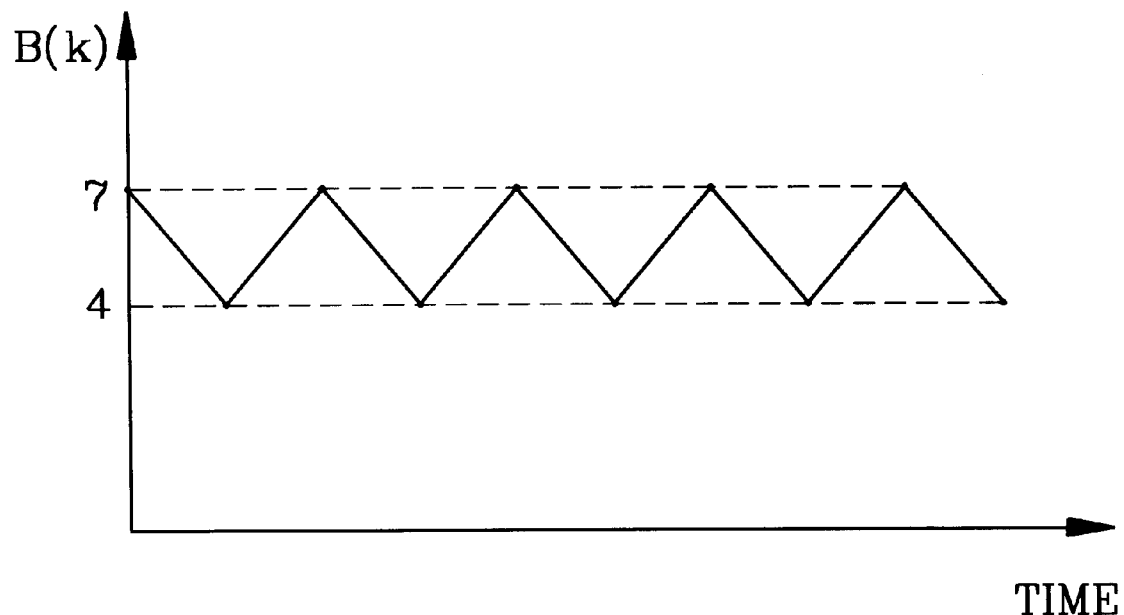
FIG. 3 is a sampling wave form diagram of the input pulse command of the manually-operated handwheel interpolation generating device of the preferred embodiment of the present invention.
Figure 4:
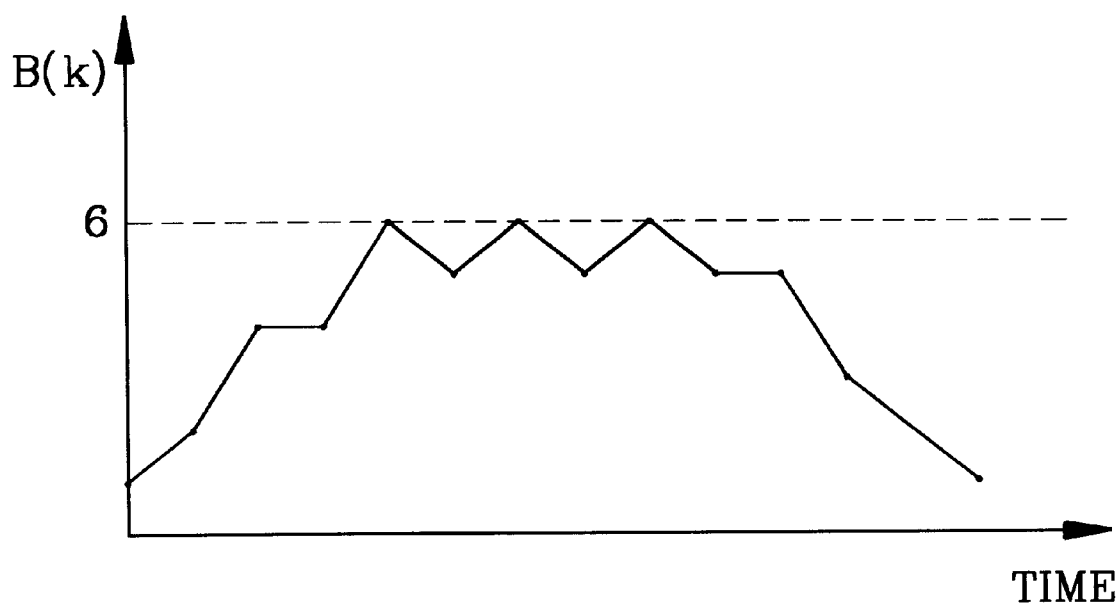
FIG. 4 is the pulse command wave diagram of the manually-operated handwheel after being smoothing dressed of the preferred embodiment of the present invention.

In order to further explain the technical characteristics of the present invention, the authors hereby take sampling figures of the handwheel digits in a practical and preferred embodiment for example to give a detailed illustration:

First of all, the pulse smoothing dresser 622 depicted by the present invention adopts the Backward Averaging Method. The operators can have the input of an average sampling time n (The n being the dressing parameter, and the pre-set value of n=5 is used in the present embodiment). Assume that the input pulse in each sampling time of the pulse amount of the input pulse smoothing dresser 622 are A(1), A(2), A(3)—A(K) as the pulse wave form shown in FIG. 3, the sampling wave form diagram of the input pulse command of the manually-operated handwheel interpolation generating device of the preferred embodiment of the present invention. Besides, the output pulse amount after being dressed by the pulse smoothing dresser 622 eare B(1), B(2), B(3),—B(K), B(K+1)— B(K+(n−1)) as shown in FIG. 4 which is the handwheel pulse command wave form diagram after being smoothing dressed of the embodiment of the present invention wherein the relationship between A and B is as follows:

$$B(i) = \left( \frac{\sum_{m=0}^{n-1} A(i-m)}{n} + Rem(i-1) \right)$$

Take the integer in the light of the above formula and plug in the remainder into Rem(i) wherein if i−m<0 or i−m>K then substitute A(i−m)=0 into the above formula for calculation.

In order to depict the above formula further, we hereby take a pulse series as follows for example: 7, 4, 7, 4, 7, 4, 7, 4, 7, 4 and a dressing parameter is assumed to be 5 as the wave form shown in FIG. 3. We then dress the series of the wave form by the use of the pulse smoothing dresser 622 and yield the result of the output pulse as:

$$B(1) = \left(\frac{7}{5}\right) \text{ take the integer} = 1$$

$$Rem(1) = \left(\frac{7}{5}\right) \text{ Remainder} = \frac{2}{5}$$

$$B(2) = \left(\frac{7+4}{5} + \frac{2}{5}\right) \text{ take the integer} = 2$$

$$Rem(2) = \left(\frac{7+4}{5} + \frac{2}{5}\right) \text{ Remainder} = \frac{3}{5}$$

Therefore, the output pulse becomes B(i) =1, 2, 4, 4, 6, 5, 6, 5, 6, 5, 5, 3, 2, 1 etc. As we compare A(i) with B(i), we can find out the following features:

(1) The output pulse B(i) after being dressed is smoother than the input pulse A(i), therefore, each axial command generated by the transmitted interpolation generator is relatively smooth too, thereby, it can improve the surface roughness of workpieces.

(2) The peak value of the output pulse B(i) after being dressed is 6 which is lower than the peak value 7 of the input pulse A(i) without being dressed, and said input pulse A(i) will show prominent intense variation in its peak value while the output pulse B(i) won't.

(3) The total amount of output pulse B(i) and input pulse A(i) are the same (55 each) after being dressed, thereby, the average speed is not affected after being dressed, i.e. it can keep the same sense in hands.

On the other hand, the item 2 of the foregoing advantages mainly lies in its being able to have relatively low peak value as well as increasing the roundness during the process of interpolation under the condition of keeping the same sense in hands (i.e. same average speed).

Besides, the pulse adjuster 60 can have a weighted factor K(i) added, that is, to modify the foregoing formula to become $$B(i) = \left( \frac{\sum_{m=0}^{n-1} A(i-m)}{n} + Rem(i-1) \right)$$

and take an integral. In this way, it can further upgrade the precision level at each sampling point.

What is more, the dressing parameter n of the foregoing formula can be perform dynamic type of variation, e.g. when the value of input pulse A(i)<10, the dressing parameter of the average sampling n=1; when 10≦A(i)<100, the dressing parameter n=3 ; when 100≦A(i)<200, then, the dressing parameter n=5----- etc., that is, the dressing parameter n automatically become larger depending on the variation of the input pulse A(i), by means of this, it will make the output pulse B(i) after being dressed maintain its sensitivity when the input pulse A(i) is very small; and it will increase the dressing parameter n to increase the smoothness when the input pulse A(i) is very large and is apt to vary intensively.

Figure 5:
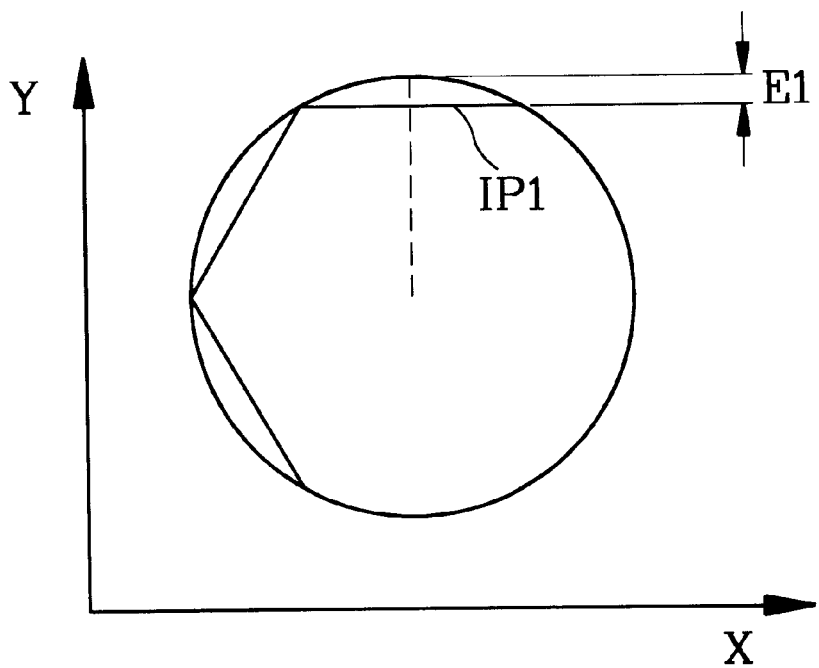
FIG. 5 is the schematic arc interpolation diagram of executing the manually-operated handwheel command without the action of being smoothing dressed.
Figure 6:
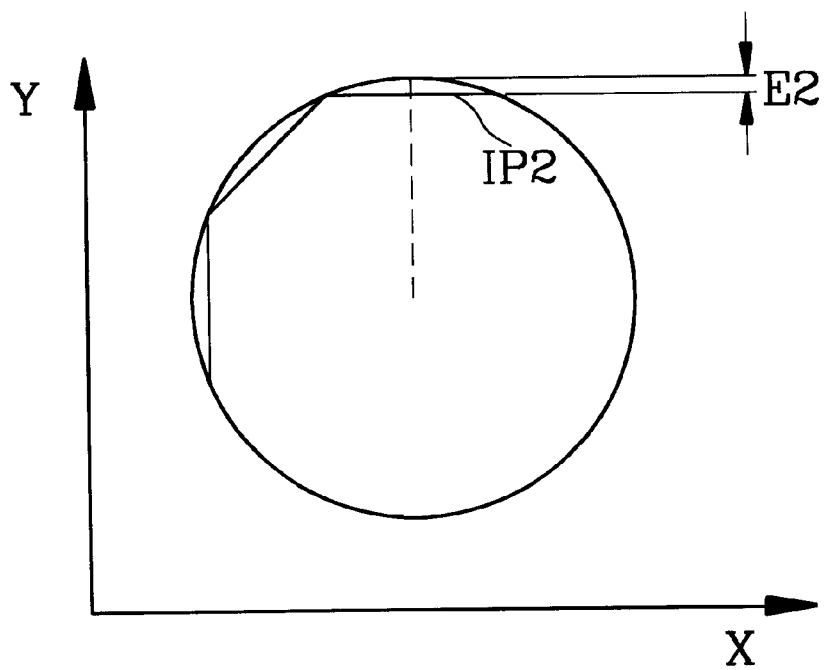
FIG. 6 is the schematic arc interpolation diagram of executing the manually-operated handwheel command with the action of being smoothing dressed.

Refer to FIG. 5 and FIG. 6, we will make a relative comparison of the handwheel command arc interpolation before and after the dressing, where FIG. 5 is the schematic arc interpolation diagram of executing the manually-operated hand-wheel command without the action of being smoothing dressed while FIG. 6 is the schematic arc interpolation diagram of executing the manually-operated handwheel command with the action of being smoothing dressed. In the light of comparing the difference between FIG. 5 and FIG. 6, since the peak value of the output pulse B(i) after being dressed is small than that of the input pulse A(i), hence, the chord length IP2 of the interpolation amount generated by the interpolation generator into which after being smoothing dressed and sent, is smaller than the chord length IP1 of the interpolation amount of the original peak value generated through the interpolation generator (i.e. IP2<IP1); thereby, the radial error E2 after being smoothing dressed is small than the radial error E1 without being smoothing dressed (i.e. E2 <E1) ; therefore, the roundness precision acquired by executing the arc interpolation after the pulse command being dressed is relatively better.

To summarize the foregoing illustration, the manually-operated handwheel interpolation generation device is an application of the lathe machine tool which can provide computerized numerical control in post- stage machining work. The main object is, without programming the tool path, to be able to perform bi-axial synchronous action; and the output pulse command of the handwheel, which will go through a pulse smoothing dresser 622, will make the output pulse become relatively smooth under the condition of invariant total amount, thereby, it can upgrade the precision level and surface roughness of the workpieces. These fully reveal that the objectives and efficacies of the present invention are very progressive in its embodiments and valuable in the industrial applications. In addition, it is an innovation not found in the market and is fully in conformation with the requirements of patent application elements from being stuck or damaged while the tray is moving.

Although the present invention has been illustrated and described previously with reference to the preferred embodiments thereof, it should be appreciated that it is in no way limited to the details of such embodiments, but is capable of numerous modifications without the scope of the appended claims.

What is claimed is:

1. A manually-operated handwheel interpolation generation device mainly comprises:
   a control panel, which is for the user to control the handwheel and is having a pulse command;
   a pulse adjuster, which is connected to said control panel and is used to smoothingly adjust the output pulse command from the control panel in order make the output pulse of the handwheel relatively smooth;
   an interface of machining item input of man-machine interface which acts as the input end of said pulse adjuster and provide man-machine interface operation required by the users.

2. A manually-operated handwheel interpolation generation device as claimed in claim 1 wherein said control panel further comprises a handwheel and its multiplicative selection switch for the user to operate the handwheel.

3. A manually-operated handwheel interpolation generation device as claimed in claim 1 wherein said control panel further comprises a pulse dresser hardware switch to be the switch of said pulse adjuster.

4. A manually-operated handwheel interpolation generation device as claimed in claim 1 wherein said pulse adjuster comprises a pulse smoothing dresser and a linear and arc interpolation generator.

5. A manually-operated handwheel interpolation generation device as claimed in claim 1 wherein said pulse adjuster further comprises a dynamic smoothing dressing parametric adjuster to perform related modified parametric adjustment.

6. A manually-operated handwheel interpolation generation device as claimed in claim 1 wherein said pulse adjuster further comprises an interface of a man-machine interface machining item input.

7. A manually-operated handwheel interpolation generation device as claimed in claim 1 wherein said pulse smoothing dresser adopts Backward Averaging Method to perform sampling signals.

8. A manually-operated handwheel interpolation generation device as claimed in claim 1 wherein said device further comprises a position control hardware connected to the output end of said pulse adjuster to be the position changing control of the handwheel.

9. A manually-operated handwheel interpolation generation device as claimed in claim 1 wherein said device further comprises a servo control hardware connected to say position control hardware to be the servo control of the handwheel.

10. A manually-operated handwheel interpolation generation device as claimed in claim 1 wherein said pulse adjuster generates linear, arc and curvilinear interpolation commands through the calculation of software or hardware.

11. A manually-operated handwheel interpolation generation device as claimed in claim 2 wherein the operation method of said multiplicative selection switch mainly lies in its being able to be substituted by the multiplication of pulse and its method of substitution is that if the pulse multiplication is 10 or 100, then, said pulse adjuster will be automatically open; but if the multiplication of pulse is 1, then, said pulse adjuster will be automatically closed so that the minute action of the handwheel can be precisely expressed.

12. A manually-operated handwheel interpolation generation device as claimed in claim 3 wherein the operation method of said pulse dresser hardware switch mainly lies in its being able to be substituted by the multiplication of pulse and its method of substitution is that if the pulse multiplication is 10 or 100, then, said pulse adjuster will be automatically open; but if the multiplication of pulse is 1, then, said pulse adjuster will be automatically closed so that the minute action of the handwheel can be precisely expressed.

13. A manually-operated handwheel interpolation generation device as claimed in claim 4 wherein said linear and arc interpolation generator can include the generation of curvilinear interpolation which make the arc interpolation be able to be expressed by the method of curvilinear interpolation.

14. A manually-operated handwheel interpolation generation device as claimed in claim 5 wherein the adjustment of said dynamic smoothing dressing parameter is controlled to adjust by the method of software.

15. A manually-operated handwheel interpolation generation device as claimed in claim 7 wherein said average method of sampling includes an average sampling time and is a dressing parameter.

16. A manually-operated handwheel interpolation generation device as claimed in claim 7 wherein the peak value of the output pulse of said pulse smoothing dresser is smaller than that of the input pulse, i.e. the variation of output pulse is relatively not so intense, and it can keep constant average speed.

17. A manually-operated handwheel interpolation generation device as claimed in claim 7 wherein the output pulse is together with input pulse divides by the dressing parameter, then is added to by the remainder relationship, and further take an integral.

18. A manually-operated handwheel interpolation generation device as claimed in claim 7 wherein besides that the output pulse is together with input pulse divides by the dressing parameter, it is also multiplied to by a weighted value in order to upgrade the precision level of sampling.

19. A manually-operated handwheel interpolation generation device as claimed in claim 11 wherein the way it automatically opens the pulse adjuster means opens the pulse smoothing dresser of said pulse adjuster.

20. A manually-operated handwheel interpolation generation device as claimed in claim 12 wherein the way it automatically opens the pulse adjuster means opens the pulse smoothing dresser of said pulse adjuster.

* * * * *